(12) United States Patent
Ganiger et al.

(10) Patent No.: US 10,156,159 B1
(45) Date of Patent: Dec. 18, 2018

(54) SQUEEZE FILM DAMPER FOR A GAS TURBINE ENGINE

(71) Applicant: General Electric Company, Schenectady, NY (US)

(72) Inventors: Ravindra Shankar Ganiger, Bangalore (IN); Satish Kumar Yadav, Bangalore (IN); Shuvajyoti Ghosh, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/682,694

(22) Filed: Aug. 22, 2017

(51) Int. Cl.
*F16C 27/04* (2006.01)
*F01D 25/16* (2006.01)
*F16F 15/023* (2006.01)
*F01D 25/06* (2006.01)
*F01D 5/10* (2006.01)

(52) U.S. Cl.
CPC ........ *F01D 25/164* (2013.01); *F16F 15/0237* (2013.01); *F01D 5/10* (2013.01); *F01D 25/06* (2013.01); *F16C 27/045* (2013.01)

(58) Field of Classification Search
CPC ...... F01D 25/06; F01D 25/164; F16C 27/045; F16C 2360/23
See application file for complete search history.

(56) References Cited

U.S. PATENT DOCUMENTS

| | | |
|---|---|---|
| 2,602,009 A | 7/1952 | Barlow et al. |
| 4,279,451 A | 7/1981 | Heldt |
| 4,527,910 A | 7/1985 | Fleming |
| 4,867,655 A * | 9/1989 | Barbic ................ F16F 15/0237 417/407 |
| 4,992,024 A | 2/1991 | Heydrich |
| 5,169,241 A | 12/1992 | Singh |
| 5,320,134 A | 7/1994 | Singh |
| 5,344,239 A | 9/1994 | Stallone et al. |
| 6,158,898 A | 12/2000 | Jeng et al. |
| 7,329,048 B2 | 2/2008 | Klusman et al. |
| 7,431,504 B1 * | 10/2008 | Pelfrey ................ F01D 25/164 384/535 |
| 7,517,152 B1 * | 4/2009 | Walsh ..................... F16C 23/08 384/99 |
| 8,182,153 B2 | 5/2012 | Singh et al. |

(Continued)

OTHER PUBLICATIONS

U.S. Appl. No. 15/135,908, filed Apr. 22, 2016.

(Continued)

*Primary Examiner* — Phillip A Johnson
(74) *Attorney, Agent, or Firm* — General Electric Company; William Andes

(57) ABSTRACT

Squeeze film damping systems and methods therefore are provided that include features for optimizing the damping response to vibrational loads experienced by a rotary component of a gas turbine engine. In one exemplary aspect, a damping system actively controls a dynamic sleeve to adjust the damping response. In particular, the dynamic sleeve is disposed within a chamber defined by a damper housing. The damping system controls the damper gap by translating the dynamic sleeve. When the dynamic sleeve is translated, a variable damper gap is varied, allowing for fluid to squeeze into or out of the damper gap, thereby adjusting the damping response to the vibration of the rotary component.

20 Claims, 9 Drawing Sheets

(56) References Cited

U.S. PATENT DOCUMENTS

| | | |
|---|---|---|
| 8,459,875 B2 | 6/2013 | Otsuka |
| 8,834,095 B2 | 9/2014 | Davis |
| 8,851,227 B2 | 10/2014 | Houdayer et al. |
| 9,046,001 B2 | 6/2015 | Hindle et al. |
| 9,470,262 B2 | 10/2016 | Gallimore et al. |
| 2009/0269185 A1 | 10/2009 | Spencer et al. |
| 2015/0240867 A1 | 8/2015 | Amador et al. |
| 2016/0040554 A1 | 2/2016 | Hovhannisian et al. |

OTHER PUBLICATIONS

Fleming, Dual Clearance Squeeze Film Damper for High Load Conditions, NASA TM-83619, https://ntrs.nasa.gov/archive/nasa/casi.ntrs.nasa.gov/19840016996.pdf, San Diego, California, Oct. 1984, 15 Pages.

Walton et al., Rotordynamic Evaluation of an Advanced Multi-Squeeze Film Damper—Imbalance Response and Bladeloss Simulation, International Gas Turbine and Aeroengine Congress and Exposition, http://proceedings.asmedigitalcollection.asme.org/proceeding.aspx?articleid=2197148&resultClick=3, Orlando, Florida, Jun. 1991, 7 Pages.

Bhat et al., Analysis of High Load Dampers, NASA-CR-165503, PWA-5779-10, Document ID 19820015374, http://ntrs.nasa.gov/archive/nasa/casi.ntrs.nasa.gov/19820015374.pdf, Aug. 21, 1981, 98 Pages.

Pratap, et al., Squeeze Film Effects in MEMS Devices, Journal of the Indian Institute of Science, http://eprints.library.iisc.emet.in/id/eprint/12328, vol. 87:1, Jan.-Mar. 2007, pp. 75-94.

\* cited by examiner

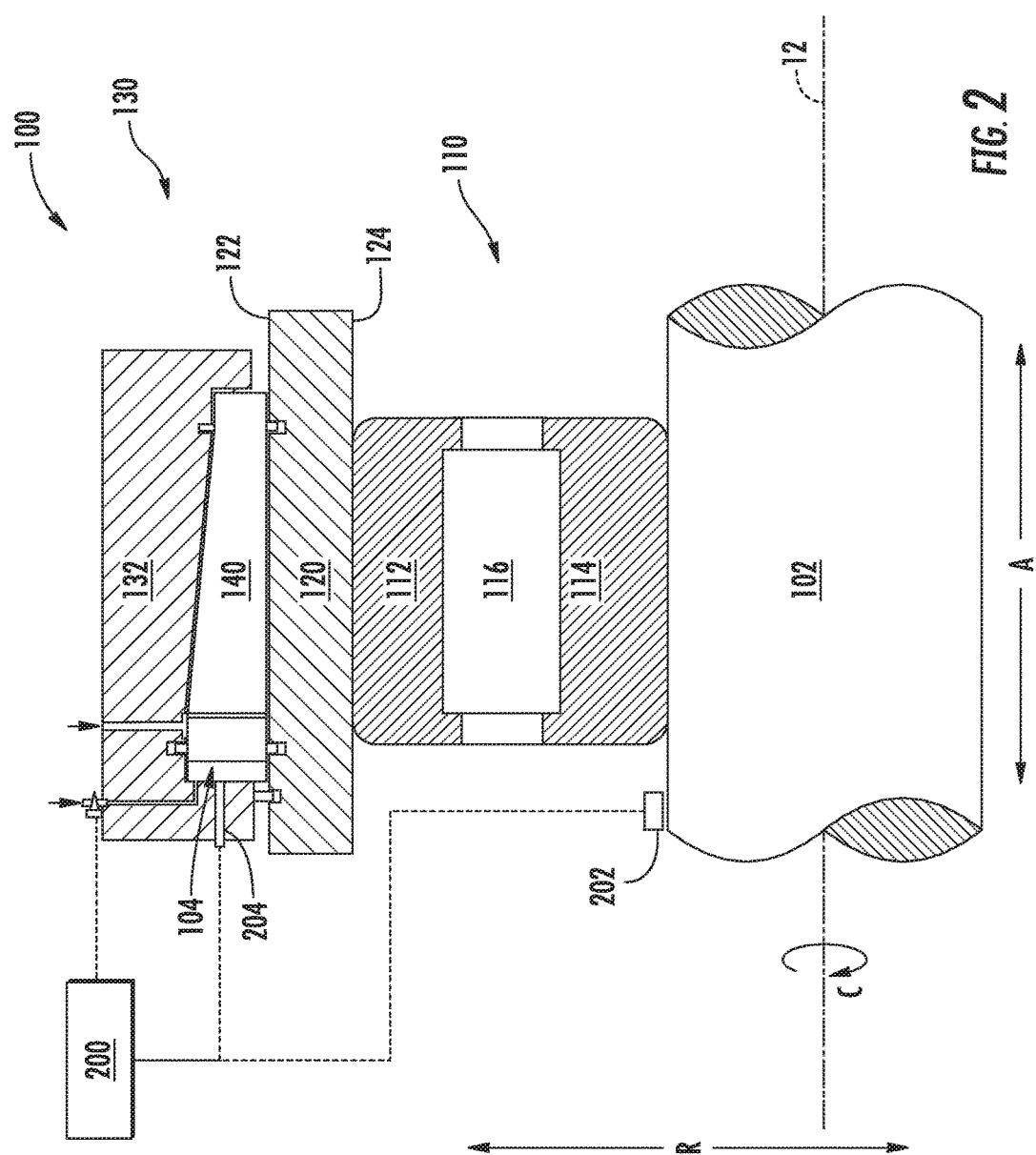

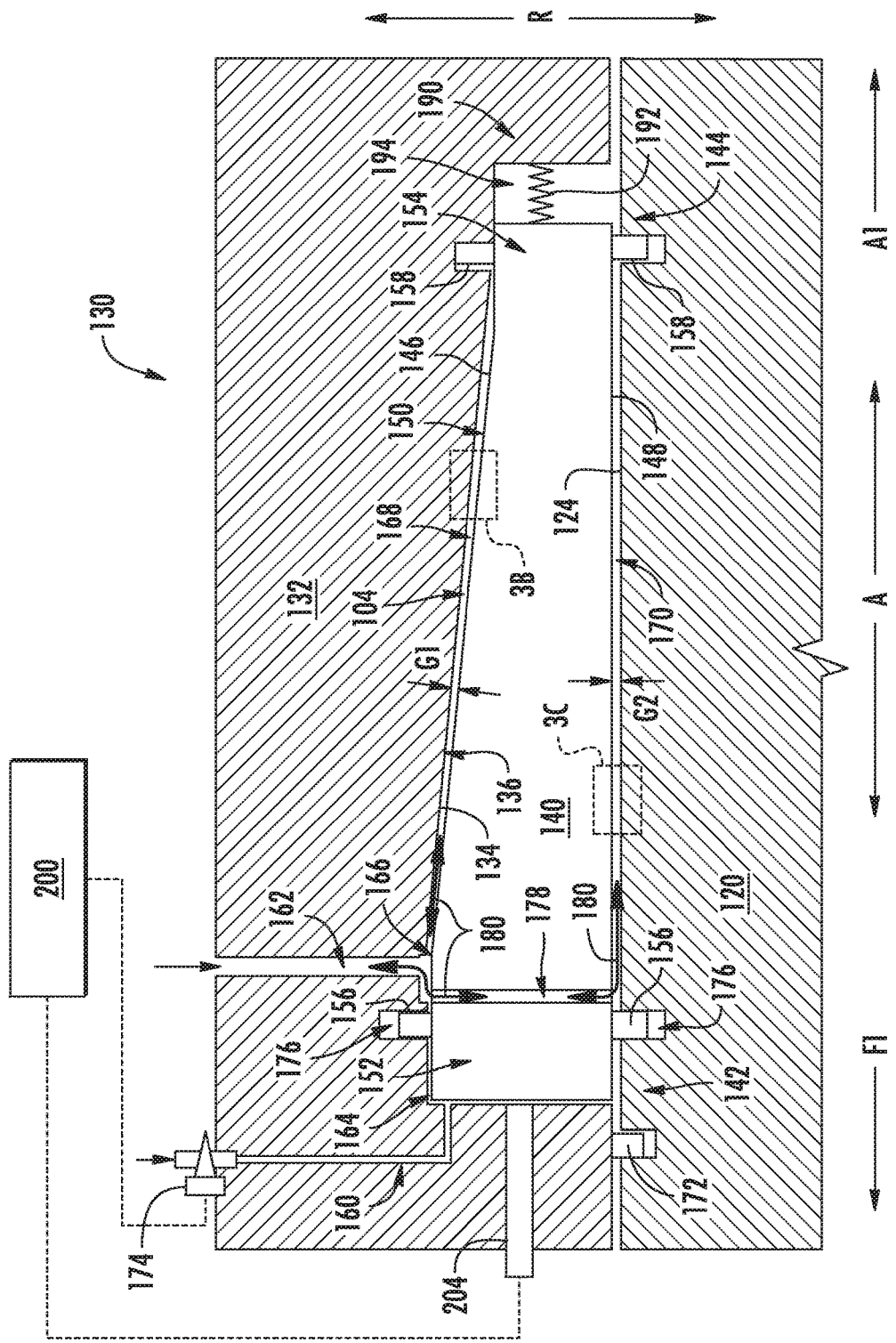

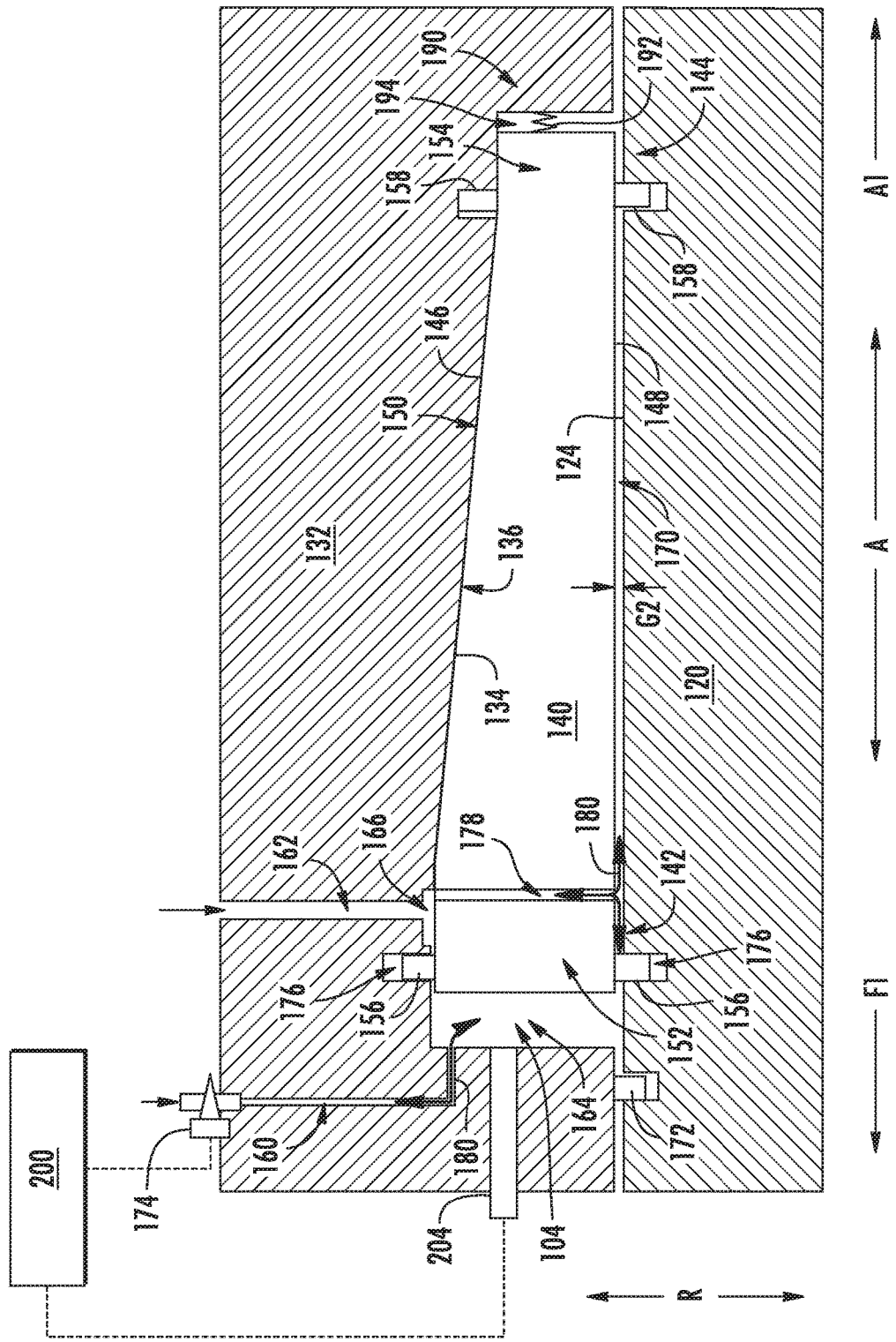

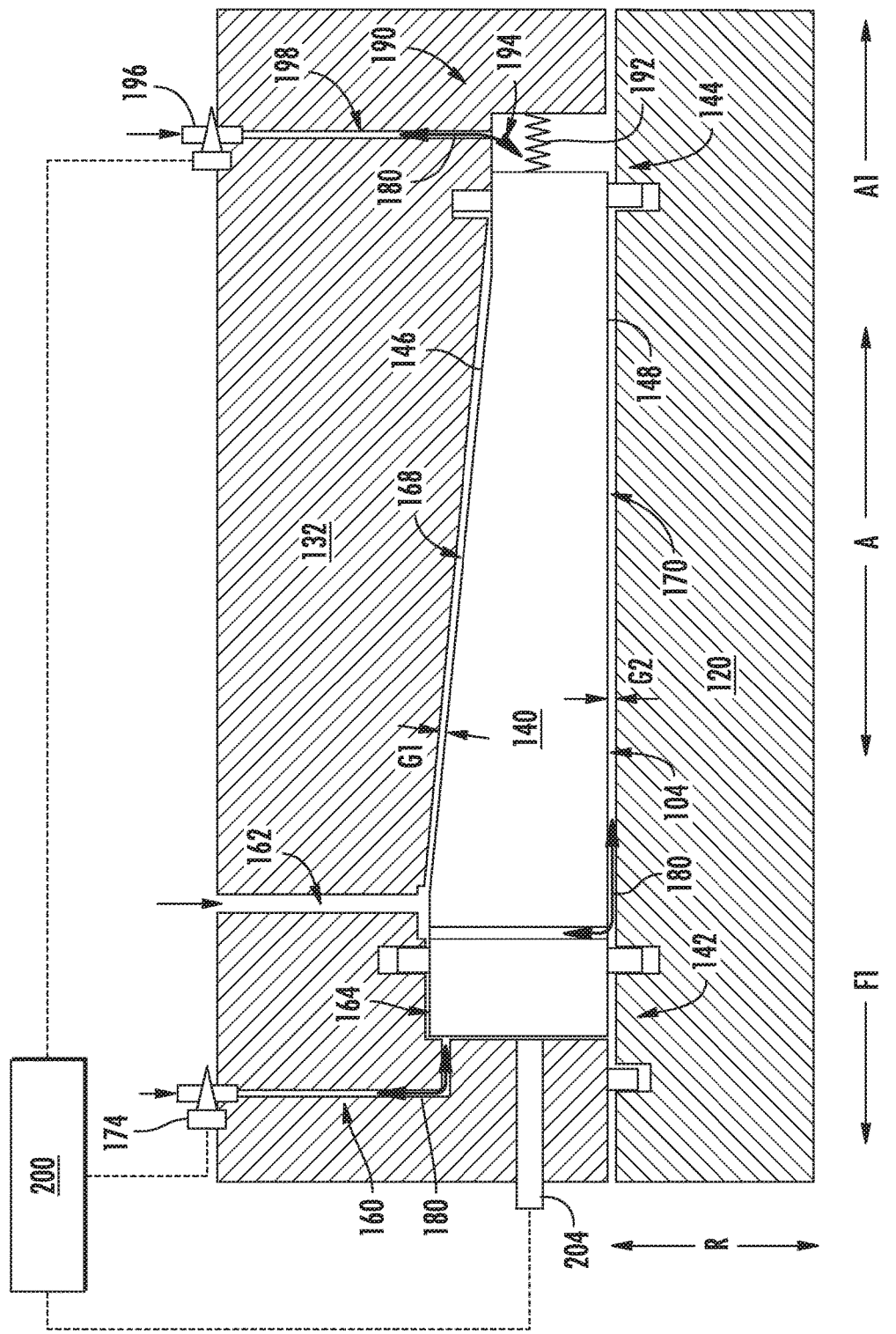

SQUEEZE FILM DAMPER FOR A GAS TURBINE ENGINE

FIELD

The present subject matter relates generally to damping systems for gas turbine engines, and more particularly to squeeze film dampers for gas turbine engines.

BACKGROUND

Rotary components of gas turbine engines can experience a wide range of vibrational loads during operation. For instance, one or more shafts or rotors can experience a large range of vibrational amplitudes and eccentricities depending on the operational conditions of the engine. The rotating rotors are typically supported and retained by bearing assemblies and vibrational loads are controlled and dampened by damping assemblies.

Conventional bearing damping assemblies have been configured to dampen either the vibrational loads experienced by the rotor during normal operations or the vibrational loads experienced by the rotor during high unbalanced or high eccentricity conditions, such as e.g., during a bowed rotor start or during cold oil operations. Although it is desirable to have damping capability for both normal operations and high unbalanced operations, conventional bearing damping assemblies have been designed specifically for these different operating conditions due to the conflicting damping requirements for damping the vibrational loads during normal operations and high unbalance operations. Thus, gas turbine engines typically include separate damping assemblies for damping the wide range of vibrational loads. These separate damping assemblies add weight and take up valuable space in the engine. Moreover, such conventional bearing damping assemblies have not provided optimized damping responses for the full range of vibrational loads that the engine can potentially experience during operation.

Therefore, improved damping systems and methods for optimizing the damping response to the vibration loads experienced by a rotary component of a gas turbine engine for a wide range of operational conditions would be useful.

BRIEF DESCRIPTION

Aspects and advantages of the invention will be set forth in part in the following description, or may be obvious from the description, or may be learned through practice of the invention.

In one exemplary aspect, the present disclosure is directed to a gas turbine engine defining an axial direction and a radial direction. The gas turbine engine includes a rotary component rotatable about the axial direction and a bearing assembly operatively coupled with the rotary component and including a bearing interface. The gas turbine engine also includes a damping system that includes a damper housing spaced apart from the bearing assembly along the radial direction, the damper housing and the bearing interface defining a chamber therebetween, and wherein the damper housing has an inclined surface. The damping system also includes a dynamic sleeve disposed within the chamber and having a first wall and a second wall, the first wall of the dynamic sleeve having an inclined surface complementary to the inclined surface of the damper housing, wherein the inclined surface of the damper housing and the inclined surface of the dynamic sleeve define a first damper gap configured to receive an amount of fluid to form a first squeeze film, and wherein the second wall of the dynamic sleeve and the bearing interface define a second damper gap configured to receive an amount of fluid to form a second squeeze film. At least one of the damper housing, the bearing interface, and the dynamic sleeve define a control compartment configured to receive an amount of fluid, and wherein a change in the amount of fluid within the control compartment causes the dynamic sleeve to translate within the chamber such that the first damper gap is varied.

In some embodiments, the damper housing defines a first conduit in fluid communication with the control compartment. In such embodiments, the gas turbine engine further includes a first control valve positioned along the first conduit for selectively controlling the amount of fluid in the control compartment.

In some embodiments, the dynamic sleeve defines a radial throughhole that provides fluid communication between the first squeeze film and the second squeeze film.

In some embodiments, the chamber is segmented into the control compartment and a squeeze film compartment, the control compartment fluidly disconnected from the squeeze film compartment; and wherein the damper housing defines a second conduit in fluid communication with the squeeze film compartment.

In some embodiments, the dynamic sleeve extends between a first end and a second end along the axial direction, and wherein the control compartment is defined proximate the first end of the dynamic sleeve. In such embodiments, the damping system further includes a biasing assembly operatively configured to urge the dynamic sleeve along the axial direction in a direction toward the control compartment.

In some further embodiments, the biasing assembly includes a spring operatively coupled with the second end of the dynamic sleeve for urging the dynamic sleeve along the axial direction toward the control compartment.

In some embodiments, the dynamic sleeve extends between a first end and a second end along the axial direction, and wherein the control compartment is defined proximate the first end of the dynamic sleeve, and wherein the damper housing defines a third conduit in fluid communication with a biasing compartment defined by at least one of the damper housing and the bearing interface, the biasing compartment positioned proximate the second end of the dynamic sleeve and operatively configured to receive an amount of fluid. In such embodiments, the biasing assembly includes a biasing control valve for selectively controlling the amount of fluid in the biasing compartment. When the biasing compartment is filled with a threshold amount of fluid, the dynamic sleeve is urged along the axial direction toward the control compartment.

In some embodiments, the second wall of the dynamic sleeve has an inclined surface. In such embodiments, the bearing interface includes a second sleeve having a first wall, the first wall having an inclined surface complementary to the inclined surface of the second wall of the dynamic sleeve. In such embodiments, the inclined surface of the second wall of the dynamic sleeve and the inclined surface of the first wall of the second sleeve define the second damper gap, and wherein the change in the amount of fluid within the control compartment causes the dynamic sleeve to translate such that the second damper gap is varied.

In some embodiments, the inclined surfaces of the dynamic sleeve and the damper housing are inclined between about five (5) to about ten (10) degrees with respect to the axial direction.

In some embodiments, the second damper gap is maintained substantially constant as the dynamic sleeve is translated.

In another exemplary aspect, the present disclosure is directed to a damping system for a rotary component coupled with a bearing assembly. The damping system includes a damper housing disposed about the bearing assembly. The damping system also includes a dynamic sleeve translatable within a chamber defined by the damper housing, a first damper gap defined between the dynamic sleeve and at least one of the bearing assembly and the damper housing, and wherein when the dynamic sleeve is translated, the first damper gap is varied such that a damping response of the damping system is varied.

In some embodiments, the damper housing has an inclined surface and the dynamic sleeve has a first wall, the first wall of the dynamic sleeve having an inclined surface complementary to the inclined surface of the damper housing, wherein the inclined surface of the damper housing and the inclined surface of the dynamic sleeve define the first damper gap, the first damper gap configured to receive an amount of fluid to form a first squeeze film, and wherein at least one of the damper housing and the dynamic sleeve define a control compartment configured to receive an amount of fluid, and wherein a change in the amount of fluid within the control compartment causes the dynamic sleeve to translate such that the first damper gap is varied.

In some embodiments, the dynamic sleeve has a second wall spaced apart from the first wall, wherein the second wall of the dynamic sleeve and the bearing assembly define a second damper gap configured to receive an amount of fluid to form a second squeeze film.

In some embodiments, the dynamic sleeve extends between a first end and a second end opposite the first end, and wherein the control compartment is defined proximate the first end of the dynamic sleeve. In such implementations, the damping system further includes a biasing assembly. The biasing assembly includes a spring operatively coupled with the second end of the dynamic sleeve for urging the dynamic sleeve toward the control compartment.

In some embodiments, dynamic sleeve has a second wall having an inclined surface. In such embodiments, the damping system further includes a second sleeve having a first wall and a second wall spaced apart from the first wall, the second sleeve disposed between the bearing assembly and the second wall of the dynamic sleeve, the first wall of the second sleeve having an inclined surface complementary to the inclined surface of the second wall of the dynamic sleeve. The inclined surface of the second wall of the dynamic sleeve and the inclined surface of the first wall of the second sleeve define a second damper gap configured to receive an amount of fluid to form a second squeeze film, and wherein the change in the amount of fluid within the control compartment causes the dynamic sleeve to translate such that the second damper gap is varied.

In some further embodiments, the dynamic sleeve extends between a first end and a second end opposite the first end, and wherein the control compartment is defined proximate the first end of the dynamic sleeve, and wherein the damper housing defines a third conduit in fluid communication with a biasing compartment defined by the damper housing, the biasing compartment positioned proximate the second end of the dynamic sleeve and operatively configured to receive an amount of fluid, and wherein the biasing compartment provides fluid communication between the first damper gap and the second damper gap. In such embodiments, the biasing assembly includes a biasing control valve for selectively controlling the amount of fluid in the biasing compartment. When the biasing compartment is filled with a threshold amount of fluid, the dynamic sleeve is urged toward the control compartment.

In some embodiments, the damper housing defines a first conduit in fluid communication with the control compartment. In such embodiments, the damping system further includes a first control valve positioned along the first conduit for selectively controlling the amount of fluid in the control compartment; a vibration sensor operatively configured to sense a vibration of the rotary component; a proximity sensor operatively configured to sense a position of the dynamic sleeve; a controller communicatively coupled with the first control valve, the vibration sensor, and the proximity sensor, the controller operatively configured to: obtain one or more signals indicative of the vibration of the rotary component; obtain one or more signals indicative of the position of the dynamic sleeve; and determine a damping response based at least in part on the vibration of the rotary component. In such embodiments, the first control valve is actuated to control the amount of fluid in the control compartment based at least in part on the damping response and the position of the dynamic sleeve.

In yet another exemplary aspect, the present disclosure is directed to a method for varying a damping response of a damping system for a rotary component coupled with a bearing assembly, the damping system coupled with the bearing assembly and comprising a damper housing defining a chamber in which a dynamic sleeve is disposed, and wherein a variable damper gap is defined between the dynamic sleeve and at least one of the damper housing and the bearing assembly. The method includes translating the dynamic sleeve within the chamber to vary the variable damper gap such that the damping response of the damping system is varied.

In some implementations, the damper housing has an inclined surface and the dynamic sleeve has an inclined surface complementary to the inclined surface of the damper housing, and wherein the variable damper gap is defined between the inclined surface of the dynamic sleeve and the incline surface of the damper housing.

In some implementations, at least one of the damper housing and the dynamic sleeve define a control compartment. In such implementations, the method further includes obtaining one or more parameters indicative of the operating conditions of the rotary component; actuating a first control valve in response to the one or more parameters; and routing an amount of fluid to or from the control compartment such that the dynamic sleeve translates in such a way that the variable damper gap is varied.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 provides a cross-sectional view of an exemplary bearing assembly and damper assembly according to an exemplary embodiment of the present disclosure;

FIG. 3A provides a close up, cross sectional view of the damper assembly of FIG. 2 depicting a dynamic sleeve in a high eccentricity position;

FIG. 4 provides a close up, cross sectional view of the damper assembly of FIG. 2 depicting the dynamic sleeve in a low eccentricity position;

FIG. 5 provides a close up, cross-sectional view of an exemplary damper assembly according to an exemplary embodiment of the present disclosure;

DETAILED DESCRIPTION

Figure 1:
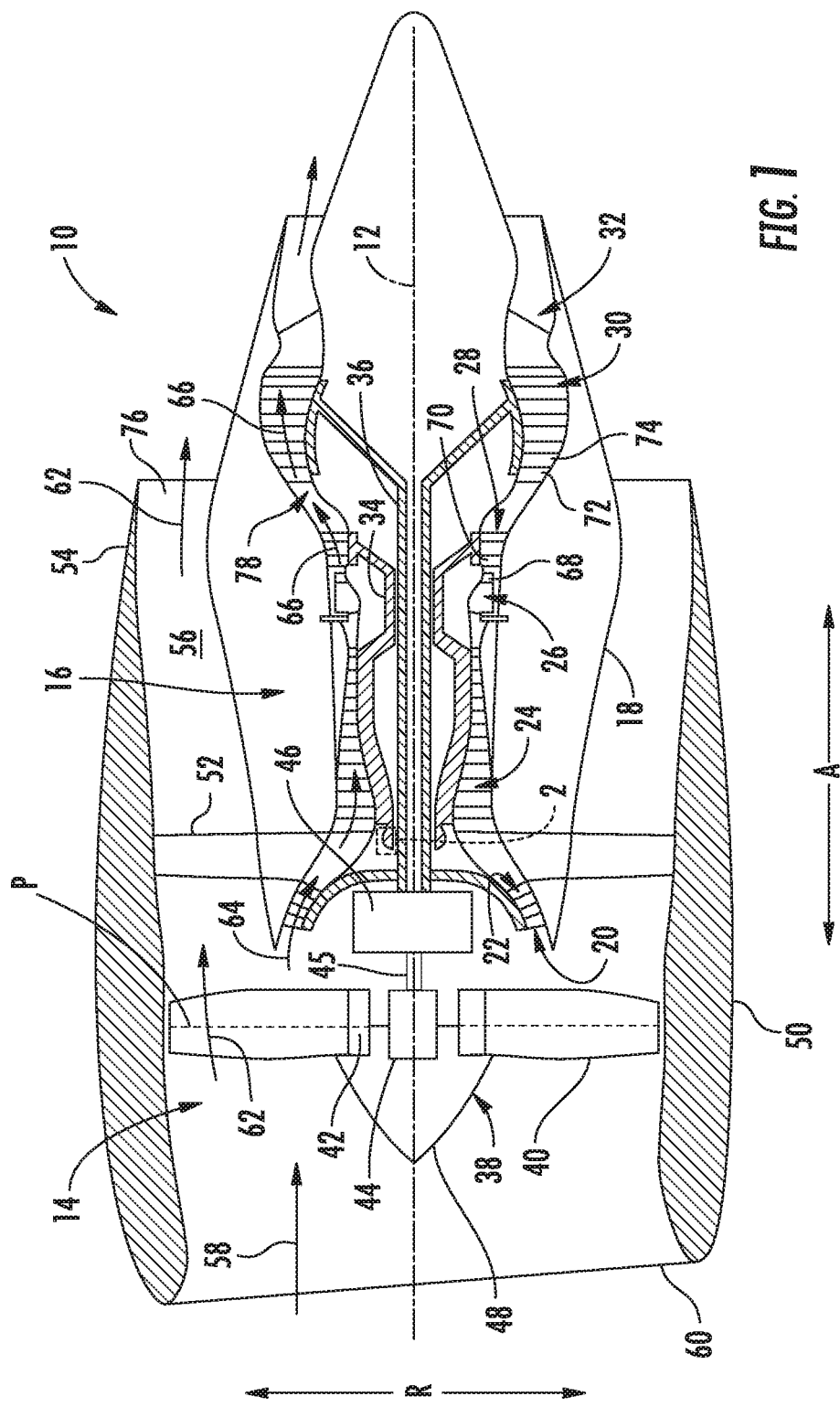
FIG. 1 provides a schematic cross-sectional view of an exemplary gas turbine engine according to various embodiments of the present disclosure.

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of any claims and their equivalents.

The detailed description uses numerical and letter designations to refer to features in the drawings. Like or similar designations in the drawings and description have been used to refer to like or similar parts of the invention, and identical numerals indicate the same elements throughout the drawings. As used herein, the terms "first", "second", and "third" may be used interchangeably to distinguish one component from another and are not intended to signify location or relative importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Aspects of the present disclosure are directed to squeeze film damping systems and methods therefore that include features for optimizing the damping response to the vibrational loads of a rotary component, such as a shaft of a gas turbine engine. In one exemplary aspect, a damping system actively controls a dynamic sleeve to adjust the damping response. In particular, the dynamic sleeve is disposed within a chamber defined by a damper housing. The dynamic sleeve includes an inclined surface that is complementary to an inclined surface of the damper housing. The inclined surfaces define a damper gap configured to receive an amount of fluid to define a squeeze film. The damping system controls the damper gap by translating the dynamic sleeve. When the dynamic sleeve is translated, the damper gap is varied, allowing fluid to squeeze into or out of the damper gap, thereby adjusting the damping response to the vibration of the rotary component.

FIG. 1 provides a schematic cross-sectional view of a gas turbine engine that provides a typical environment in which exemplary embodiments of the present disclosure can be applied. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R that is normal to the axial direction A. A circumferential direction C (not shown) revolves about the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. As schematically shown in FIG. 1, the outer casing 18 encases, in serial flow relationship, a compressor section including a booster or low pressure (LP) compressor 22 followed downstream by a high pressure (HP) compressor 24; a combustion section 26; a turbine section including a high pressure (HP) turbine 28 followed downstream by a low pressure (LP) turbine 30; and a jet exhaust nozzle section 32. A high pressure (HP) shaft or spool 34 drivingly connects the HP turbine 28 to the HP compressor 24 to rotate them in unison concentrically with respect to the longitudinal centerline 12. A low pressure (LP) shaft or spool 36 drivingly connects the LP turbine 30 to the LP compressor 22 to rotate them in unison concentrically with respect to the longitudinal centerline 12. The compressor section, combustion section 26, turbine section, and nozzle section 32 together define a core air flowpath.

For the embodiment depicted in FIG. 1, the fan section 14 includes a variable pitch fan 38 having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 via a fan shaft 45 that is powered by the LP shaft 36 across a power gear box 46. The power gear box 46 includes a plurality of gears for adjusting the rotational speed of the fan shaft 45 and thus the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Alternatively, the nacelle 50 also may be supported by struts of a structural fan frame. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrow 62 is directed or routed into the bypass airflow passage 56, and a second portion of the air 58 as indicated by arrow 64 is directed or routed into the upstream section of the core air flowpath, or more specifically into the inlet 20 of the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where the highly pressurized air is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and expand through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that in other exemplary embodiments, any other suitable HP compressor 24 and HP turbine 28 configurations may be utilized. It also should be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbojet engine, etc., as well as turbine engines used for other vehicles or in stationary applications.

FIG. 2 provides a schematic, cross-sectional view of Section 2 of FIG. 1 depicting an exemplary damping system 100 of the turbofan engine 10 according to an exemplary embodiment of the present disclosure. The damping system 100 includes a bearing assembly 110 operatively coupled to a rotary component 102, e.g., the HP shaft 34 of the turbofan engine 10 of FIG. 1. The damping system 100 also includes a damper assembly 130, which is a squeeze film damper in this embodiment. In addition, the damping system 100 includes a controller 200 and one or more sensors communicatively coupled with the controller 200, including a vibration sensor 202 positioned proximate the rotary component 102 and a proximity sensor 204 positioned proximate the damper assembly 130. The various components of the damping system 100 will be explained more fully below.

As shown in FIG. 2, the bearing assembly 110 operatively couples and supports the rotary component 102. The bearing assembly 110 can operatively couple the rotary component 102 with one or more stationary components of the turbofan engine 10 of FIG. 1, for example. For this embodiment, the bearing assembly 110 includes an outer bearing race 112 and an inner bearing race 114 spaced apart from the outer bearing race 112 along the radial direction R. The inner bearing race 114 is operatively coupled with the rotary component 102 and is rotatable about the axial direction A in unison with the rotary component 102. The outer bearing race 112 is generally stationary and can be operatively coupled with a stationary component. For instance, in this embodiment, the outer bearing race 112 is operatively coupled with a stationary bearing interface 120. Rolling or bearing elements 116 are disposed between the outer bearing race 112 and the inner bearing race 114. A cage (not labeled) can axially secure the bearing elements 116 in place and can space the bearing elements 116 apart from one another along the circumferential direction C. Although the bearing element 116 is shown in FIG. 2 as a roller bearing element, the scope of the present disclosure is equally applicable to other types of rolling bearing elements, such as e.g., ball bearings, tapered bearings, cylindrical bearings, spherical bearing elements, etc. Moreover, the bearing assembly 110 can be any suitable type of bearing assembly and is not limited to the example above.

For this embodiment, the damping system 100 includes bearing interface 120 annularly disposed about the outer bearing race 112. The bearing interface 120 includes a first wall 122 and a second wall 124 spaced apart from the first wall 122 along the radial direction R. For this embodiment, the first wall 122 is the outer wall and the second wall 124 is the inner wall of the bearing interface 120. The bearing interface 120, and more particularly the second wall 124 of the bearing interface 120, is operatively coupled with the outer bearing race 112, and like the stationary outer bearing race 112, the bearing interface 120 is a stationary component (i.e., it does not rotate about the axial direction A). In some alternative embodiments, the bearing interface 120 is integral with the outer bearing race 112. The bearing interface 120 can be, for example, the outer wall of the outer bearing race 112. In some embodiments, the bearing interface 120 can be integral with the damper housing 132.

As further shown in FIG. 2, the damper assembly 130 includes a damper housing 132. The damper housing 132 is spaced apart from the bearing interface 120. More particularly, the damper housing 132 is radially spaced and annularly disposed about the bearing interface 120. The damper housing 132 generally encloses the bearing and damping assemblies 110, 130. The damper housing 132 and the bearing interface 120 define a chamber 104 disposed therebetween.

The damper assembly 130 further includes a dynamic sleeve 140 disposed within the chamber 104 between the bearing interface 120 and the damper housing 132. As will be explained in greater detail herein, the dynamic sleeve 140 is translatable along the axial direction A such that the damping response to vibration of the rotary component 102 can be controlled for a wide range of operating conditions.

With reference still to FIG. 2, as noted above, the damping system 100 includes controller 200. The controller 200 is operatively configured to control the turbofan engine 10, and in particular, the controller 200 is operatively configured to control the damping system 100. For this embodiment, the controller 200 is equipped with Full Authority Digital Engine Control (FADEC) for providing full digital control of the turbofan engine 10 (FIG. 1). The controller 200 can include any suitable hardware and/or software. For instance, the controller 200 can include one or more processors and one or more memory devices. The one or more memory devices can store data and instructions. When the instructions are executed by the one or more processors, the processors perform operations. For example, the processors can perform a vibration analysis of one or more rotors of the turbofan engine 10, and based on the analysis, one or more components can be actuated to control the vibration of the rotors. For instance, the controller 200 can send one or more control signals to a control valve to open or close such that fluid can flow to or from the damper assembly 130.

The vibration sensor 202 is communicatively coupled with the controller 200 as shown in FIG. 2. The vibration sensor 202 can be communicatively coupled with the controller 200 by any suitable wireless or wired connection. The vibration sensor 202 is positioned proximate the rotary component 102 and is operatively configured to sense a vibration parameter of the rotary component 102. The vibration sensor 202 can be, for example, an accelerometer. The vibration parameter is descriptive of the vibration of the rotary component 102. The vibration parameter can be measured or calculated in any suitable fashion. For instance, the shaft speed, shaft vibration, shaft eccentricity, oil temperature, oil pressure, etc. can be used to determine a vibration parameter of the rotary component 102. The controller 200 can obtain one or more signals indicative of the vibration or eccentricity of the rotary component 102 from the vibration sensor 202. Moreover, although the vibration sensor 202 is positioned proximate the rotary component 102, the vibration sensor 202 can be positioned in other suitable locations as well. Moreover, the damping system 100 can include more than one vibration sensor and they can be positioned at any suitable location within the turbofan engine.

The proximity sensor 204 is likewise communicatively coupled with the controller 200 and is operatively configured to sense or measure the axial position of the dynamic sleeve 140. The proximity sensor 204 can be an eddy current sensor, for example. The controller 200 can obtain one or more signals indicative of the axial position of the dynamic sleeve 140 from the proximity sensor 204. The controller 200 can process the signals obtained from the vibration sensor 202 and the signals obtained from the proximity sensor 204, and based on these signals, the controller 200 can actuate one or more components of the damping system 100 such that that dynamic sleeve 140 can be translated to the optimal axial position to achieve the desired damping response to the vibration of the rotary component 102.

Figure 3B:
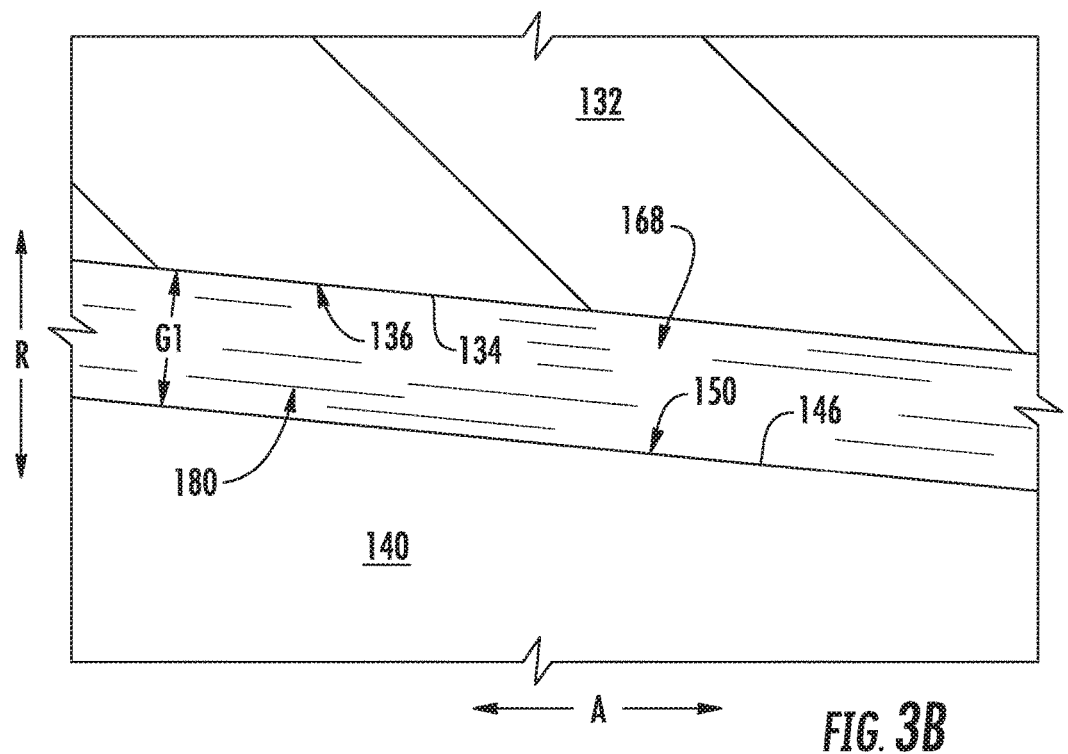
FIG. 3B provides a close up view of Section 3B of FIG. 3A.
Figure 3C:
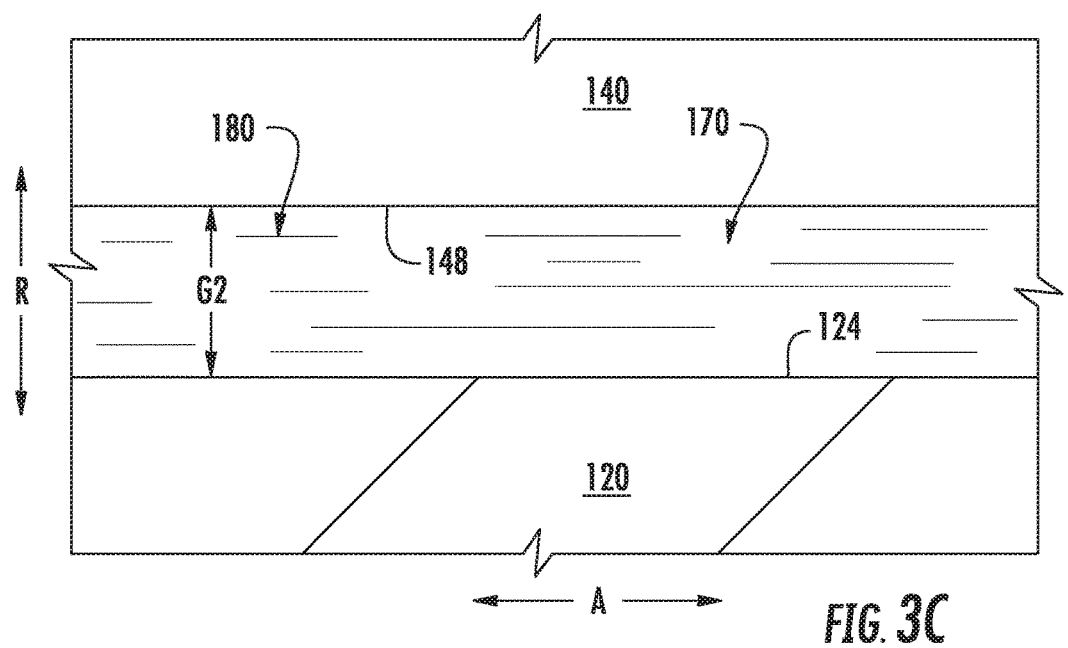
FIG. 3C provides a close up view of Section 3C of FIG. 3A.

With reference now to FIGS. 3A, 3B, 3C, and 4, the damping system 100 will now be described in greater detail. FIG. 3A provides a close up, cross-sectional view of the damping system 100 of FIG. 2 with the dynamic sleeve 140 in a first position (i.e., a forward position in this embodiment) and FIG. 4 provides the same view thereof with the dynamic sleeve 140 in a second position (i.e., an aft position in this embodiment). FIG. 3B provides a close up view of Section 3B of FIG. 3A and FIG. 3C provides a close up view of Section 3C of FIG. 3A.

As shown in FIGS. 3A and 4, the dynamic sleeve 140 is disposed between the bearing interface 120 and the damper housing 132 along the radial direction R within the chamber 104. The dynamic sleeve 140 extends between a first end 142 and a second end 144 along the axial direction A. The dynamic sleeve 140 also extends between a first wall 146 and a second wall 148 spaced apart from the first wall 146. For this embodiment, the first wall 146 is spaced apart from the second wall 148 along the radial direction R. Moreover, for this embodiment, the first wall 146 is the outer wall and the second wall 148 is the inner wall of the dynamic sleeve 140.

Notably, the first wall 146 of the dynamic sleeve 140 includes an inclined surface 150 (FIGS. 3A and 3B). The inclined surface 150 is inclined with respect to the axial direction A. For this embodiment, the inclined surface 150 inclines or gradually narrows radially inward as the dynamic sleeve 140 extends toward the aft direction A1 along the axial direction A. Moreover, as shown for this embodiment, the second wall 148 of the dynamic sleeve 140 extends along the axial direction A without inclining or gradually narrowing with respect to the axial direction A.

As further shown in FIGS. 3A and 4, the dynamic sleeve 140 includes a first end portion 152 proximate its first end 142 where the first wall 146 ceases to incline. Stated differently, the first wall 146 of the first end portion 152 of the dynamic sleeve 140 does not incline or narrow with respect to the axial direction A. The first end portion 152 allows for seals 156 to engage or seal against the dynamic sleeve 140 regardless of its axial position. The dynamic sleeve 140 also includes a second end portion 154 proximate its second end 144 where the first wall 146 ceases to incline with respect to the axial direction A. Second end portion 154 allows for seals 158 to engage or seal against the dynamic sleeve 140 regardless of its axial position.

The chamber 104 is segmented into various compartments as depicted in FIGS. 3A and 4. In particular, the chamber 104 is segmented into a control compartment 164, a squeeze film compartment 166, and a biasing compartment 194. In the illustrated embodiment, the control compartment 164, the squeeze film compartment 166, and the biasing compartment 194 are not fluidly connected. Stated differently, the three compartments are not in fluid communication with one another.

As shown particularly in FIG. 4, the control compartment 164 is generally defined between the damper housing 132 and the bearing interface 120 along the radial direction R and between an interface seal 172/damper housing 132 and seals 156/first end 142 of the dynamic sleeve 140 along the axial direction A. The control compartment 164 also extends along the circumferential direction C about the longitudinal centerline 12 (FIG. 1). The squeeze film compartment 166 is generally defined generally by the damper housing 132 and the bearing interface 120 along the radial direction R. The squeeze film compartment 164 extends between seals 156 positioned proximate the first end 142 of the dynamic sleeve 140 and the seals 158 positioned proximate the second end 144 of the dynamic sleeve 140. The squeeze film compartment 164 is fluidly disconnected or segmented from the control compartment 164 by seals 156 positioned within their respective annular indents 176 defined by the damper housing 132 and the bearing interface 120 as shown in FIGS. 3A and 4. As the dynamic sleeve 140 translates along the axial direction A, the seals 156 prevent fluid 180 from breaching from the control compartment 164 into the squeeze film compartment 166 and vice versa. The biasing compartment 194 is generally defined by the damper housing 132 and the bearing interface 120 along the radial direction R and between the dynamic sleeve 140 and a wall of the damper housing 132 along the axial direction A. The biasing compartment 194 is fluidly disconnected or segmented from the squeeze film compartment 166 by seals 158 and the dynamic sleeve 140 as shown in FIGS. 3A and 4.

As further shown in FIGS. 3A and 4, the damper housing 132 defines a first conduit 160. The first conduit 160 provides fluid communication between a fluid supply (not shown) and the control compartment 164 (FIG. 4). Depending on the vibration of the rotary component 102 (FIG. 2) during operation of the turbofan engine 10 (FIG. 1), the control compartment 164 can be pressurized with fluid 180 (FIG. 4) such that the dynamic sleeve 140 can be translated along the axial direction A. For instance, as shown in FIG. 3A, the dynamic sleeve 140 can be translated such that the dynamic sleeve 140 occupies the space within the control compartment 164. A first control valve 174 is positioned along the first conduit 160 and is operatively configured to selectively control the pressure of fluid 180 within the control compartment 164. The fluid can be, for example, oil or another incompressible fluid. The damper housing 132 also defines a second conduit 162. The second conduit 162 provides fluid communication between the fluid supply (not shown) and the squeeze film compartment 166.

Referring still to FIGS. 3A and 4, within the squeeze film compartment 166 of the chamber 104, a number of squeeze films can be defined. In particular, for this embodiment, a first squeeze film 168 and a second squeeze film 170 can be defined in the squeeze film compartment 166 as explained more fully below.

As shown in FIGS. 3A and 3B, the damper housing 132 has a first wall 134 that includes an inclined surface 136. The inclined surface 150 of the dynamic sleeve 140 and the inclined surface 136 of the damper housing 132 are complementary to one another. Stated differently, the inclined surfaces 136, 150 have the same or substantially the same degree of inclination with respect to the axial direction A. In some embodiments, for example, the inclined surfaces 150, 136 of the dynamic sleeve 140 and the damper housing 132 are inclined between about five (5) to about ten (10) degrees with respect to the axial direction A. As used herein, "about" means within about 10% of the stated value or parameter. The inclined surfaces 136, 150 define a first damper gap G1 configured to receive an amount of fluid to form the first squeeze film 168. The first squeeze film 168 is defined between the damper housing 132 and the dynamic sleeve 140 along the radial direction R, between the seals 156 proximate the first end 142 and the seals 158 proximate the second end 144 of the dynamic sleeve 140 along the axial direction A, and along the circumferential direction C.

For this embodiment, the first damper gap G1 is variable depending on the axial position of the dynamic sleeve 140. For instance, as shown in FIG. 3A, when the dynamic sleeve 140 is in a first position, the first damper gap G1 is more open or at a high radial clearance, which allows a greater quantity of fluid to squeeze into the gap to provide damping capability at high eccentric movements of shaft 102 (FIG. 2). In contrast, as shown in FIG. 4, when the dynamic sleeve 140 is in a second position, the first damper gap G1 is more closed or at a low radial clearance, which effectively squeezes the viscous fluid out of the gap providing damping at low eccentric movements of shaft 102 (FIG. 2).

As shown in FIGS. 3A and 3C, the second wall 124 of the bearing interface 120 and the second wall 148 of the dynamic sleeve 140 define a second damper gap G2, which is configured to receive an amount of fluid 180 to form the second squeeze film 170. For this embodiment, the second squeeze film 170 is defined between the bearing interface 120 and the dynamic sleeve 140 along the radial direction R, between the seals 156 proximate the first end 142 and the seals 158 proximate the second end 144 of the dynamic sleeve 140 along the axial direction A, and along the circumferential direction C. As noted previously, for this embodiment, the second wall 148 of the dynamic sleeve 140 does not incline in the radial direction R as the dynamic sleeve 140 extends along the axial direction A. Similarly, the second wall 124 of the bearing interface 120 does not incline or gradually narrow in the radial direction R as it extends along the axial direction A. Thus, the second damper gap G2 maintains a substantially constant clearance or gap no matter the axial position of the dynamic sleeve 140.

Referring to FIG. 3A, for this embodiment, the first damper gap G1 is in fluid communication with the second damper gap G2 via a radial throughhole 178 defined by the dynamic sleeve 140. As shown in FIGS. 3A and 4, the radial throughhole 178 extends between the first wall 146 and the second wall 148 of the dynamic sleeve 140 or between first damper gap G1 and the second damper gap G2. Although only one radial throughhole is depicted in FIGS. 3A and 4, it will be appreciated that dynamic sleeve 140 can define multiple radial throughholes. For instance, dynamic sleeve 140 can define multiple radial throughholes spaced apart from one another along the circumferential direction C.

As shown in FIG. 3A, the second conduit 162 is in fluid communication with the first damper G1. The damping response, which corresponds in part with the thickness of the first squeeze film 168, can be adjusted by squeezing fluid 180 into or out of the first damper gap G1 via translation of the dynamic sleeve 140. Accordingly, fluid 180 can be routed into or out of the second fluid conduit 162 when fluid 180 is squeezed out of the first damper gap G1 by the translation of the dynamic sleeve 140. The second conduit 162 and the first damper gap G1 are also in fluid communication with the second damper gap G2 via the radial throughhole 178 as noted above. In this way, fluid 180 can flow through the radial throughhole 178 from the second conduit 162 and into the second damper gap G2. Fluid 180 can squeeze into or out of the second damper gap G2 to adjust the thickness of the second squeeze film 170.

Referring still to FIGS. 3A and 4, as shown, the damper assembly 130 also includes a biasing assembly 190. The biasing assembly 190 is operatively configured to bias or urge the dynamic sleeve 140 along the axial direction A. More particularly, for this embodiment, the biasing assembly 190 is configured to apply a biasing force on the dynamic sleeve 140 in the forward direction F1 such that the dynamic sleeve 140 is biased or urged in the forward direction F1 toward the control compartment 164 (in the absence of a counteracting force applied in the aft direction A1, such as e.g., by the fluid within control compartment 164 applying pressure on the dynamic sleeve 140).

For this embodiment, the biasing assembly 190 includes a spring 192 disposed within the biasing compartment 194. The spring 192 is operatively coupled to a wall of the damper housing 132 and to the second end 144 of the dynamic sleeve 140 as shown in FIGS. 3A and 4. As shown particularly in FIG. 3A, when dynamic sleeve 140 is in the first position, the spring 192 biases or urges the dynamic sleeve 140 such that the dynamic sleeve 140 occupies the space of the control compartment 164. As shown in FIG. 4, when dynamic sleeve 140 is in the second position, the spring 192 is in a compressed state, as the fluid within the control compartment 164 has overcome the biasing force of the spring 192.

With reference now to FIGS. 1 through 4, the damping system 100 is operatively configured to optimize the damping response to vibration of the rotary component 102 (FIG. 2) for a wide range of operating conditions of the turbofan engine 10 (FIG. 1). To optimize the damping response, the damping system 100 controls the translation of the dynamic sleeve 140 along the axial direction A by fluid pressure activation. By translating the dynamic sleeve 140, the damping system 100 can optimize the damping response to control the vibration of the rotary component 102.

For normal operating conditions of the turbofan engine 10 where typical vibration and eccentricity conditions of the rotary component 102 are likely or expected, the damping system 100 can control the dynamic sleeve 140 in the following manner. As shown in FIG. 2, the vibration sensor 202 senses one or more parameters indicative of the vibration of the rotary component 102. One or more signals indicative of the vibration of the rotary component 102 are then routed to the controller 200 for processing. The controller 200 receives or otherwise obtains the one or more signals indicative of the vibration of the rotary component 102. The controller 200 can also receive or otherwise obtain one or more signals indicative of the axial position of the dynamic sleeve 140 from the proximity sensor 204.

Once the controller 200 determines that the rotary component 102 is operating in normal conditions and the current axial position of the dynamic sleeve 140 is determined, the controller 200 sends one or more control signals to actuate the first control valve 174 to an open or more open position (i.e., the first control valve 174 can be actuated to a plurality of open positions) based on the vibration parameters and the current axial position of the dynamic sleeve 140. When the first control valve 174 is actuated to an open or more open position, an amount of fluid 180 flows into the control compartment 164 (FIG. 4). As the amount of fluid 180 within the control compartment 164 increases, the fluid pressure applies a force on the first end 142 of the dynamic sleeve 140. When the applied force overcomes the biasing force applied by the spring 192, the dynamic sleeve 140 translates in the aft direction A1 and compresses spring 192.

As the dynamic sleeve 140 translates in the aft direction A1 along the axial direction A, the first damper gap G1 decreases or becomes more closed. This squeezes fluid 180 out of the first damper gap G1 defined between inclined surface 136, 150. This squeezing action provides viscous damping, which can provide further damping capability to the damping system 100. In some instances, the first damper gap G1 can decrease such that the first damper gap G1 leaves only a very thin first squeeze film 168. In some instances, as shown in FIG. 4, the first damper gap G1 can be become completely closed such that no first damper gap G1 exists. Stated differently, the dynamic sleeve 140 can be translated along the axial direction A such that the inclined surfaces 136, 150 can become wedged in mating engagement with one another, thereby eliminating the first damper gap G1.

Notably, as the dynamic sleeve 140 is translated in the aft direction A1 along the axial direction A, as shown in FIG. 4, the second damper G2 remains substantially constant. In this way, the second squeeze film 170 still provides damping capability even when the dynamic sleeve 140 is translated to the second position. For this embodiment, the radial clearance of the second damper gap G2 provides a second squeeze film 170 sufficient to provide optimal damping during normal operating conditions.

For high unbalanced or high eccentricity conditions of the rotary component 102, such as e.g., during a bowed rotor start, the damping system 100 can control the dynamic sleeve 140 in the following manner. Once it is determined that the rotary component 102 is operating in a high unbalanced condition, the controller 200 can send one or more control signals to the first control valve 174 to actuate to a fully closed or more closed position. The first control valve 174 can be actuated to a closed or more closed position based on data obtained indicative of the vibration of the rotary component 102 and the current axial position of the dynamic sleeve 140.

When the first control valve 174 is actuated to a closed or more closed position, the amount of fluid 180 flowing to the control compartment 164 is reduced or in some instances completely cutoff. Accordingly, the force applied by the fluid pressure on the first end 142 of the dynamic sleeve 140 in the aft direction A1 is decreased or completely eliminated. The decreased force on the first end 142 of the dynamic sleeve 140 allows the spring 192 to expand from its compressed state, which forces the dynamic sleeve 140 to translate in the forward direction F1 along the axial direction A. The axially translation of the dynamic sleeve 140 expels the fluid 180 from the control compartment 164. For instance, as shown in FIG. 3A, nearly all of the fluid within the control compartment 164 has been removed and the spring 192 has biased the dynamic sleeve 140 such that the dynamic sleeve 140 occupies the space of the control compartment 164 when the dynamic sleeve 140 is translated to the first position. The proximity sensor 204 can provide feedback signals to the controller 200 to ensure that the dynamic sleeve 140 has been translated to the desired axial position.

As the dynamic sleeve 140 translates in the forward direction F1 along the axial direction A, the first damper gap G1 increases or widens. This allows fluid 180 to squeeze into the first damper gap G1 to increase the thickness of the first squeeze film 168. As fluid is also present in the second damper gap G2 of the squeeze film compartment 166 forming second squeeze film 170, the damping system 100 acts as a dual film squeeze film damper (when the dynamic sleeve 140 is not in the second position as shown in FIG. 4). By increasing the first damper gap G1, the damping system 100 can provide higher damping capability during high unbalanced or high eccentricity conditions. After the high unbalanced and/or high eccentricity conditions are corrected by the dual film configuration the damping system 100, the dynamic sleeve 140 can be translated back to the second position (i.e., the aft end) for optimal damping under normal operating conditions.

It will be appreciated that the dynamic sleeve 140 can be axially positioned between the first (FIG. 3A) and second positions (FIG. 4) such that the damping response to the vibration of the rotary component 102 can be optimized. Stated differently, the dynamic sleeve 140 can be translated to an intermediate position between the first and second positions such that an intermediate radial clearance of the squeeze films can be achieved. It will further be appreciated that the configuration of the damping system 100 is exemplary and that the damping system 100 can have different configurations. For instance, the damping system can be flipped horizontally such that the first and second positions are reversed.

It will further be appreciated that dynamic sleeve 140 can be translated or controlled by other suitable methods besides hydraulic actuation. For instance, dynamic sleeve 140 can be translated pneumatically (i.e., by pressurized air) by a pneumatic actuator, magnetically or electromagnetically by magnets or by MEMS magnetic actuator, electrically by an electric actuator, mechanically by a mechanical actuator, some combination of the foregoing, etc. In this way, hydraulic conduits and lines extending to and from the control compartment 164 can be removed or reduced.

FIG. 5 provides a close up, schematic cross-sectional view of an exemplary damping system 100 according to an exemplary embodiment of the present disclosure. For this embodiment, in addition to spring 192 urging the dynamic sleeve 140 in the forward direction F1, biasing assembly 190 is operatively configured to bias the dynamic sleeve 140 in the forward direction F1 via a controlled amount of fluid 180. As shown in FIG. 5, the damper housing 132 defines a third conduit 198 that provides fluid communication between a fluid supply (not shown) and the biasing compartment 194. A biasing control valve 196 is positioned along the third conduit 198 and is operatively configured to selectively control the amount of fluid 180 within the biasing compartment 194. The fluid 180 can be, for example, oil or another incompressible fluid. The biasing control valve 196 is communicatively coupled with the controller 200. The biasing control valve 196 can be communicatively coupled with the controller 200 via any suitable wireless or wired connections.

To translate the dynamic sleeve 140 in the forward direction F1 along the axial direction A, the first control valve 174 is actuated to a closed or more closed position, as noted above. This reduces the amount of fluid in the control compartment 164, and consequently, the applied force on the first end 142 of the dynamic sleeve 140 is reduced. At the same time, the biasing control valve 196 is actuated to an open or more open position. This allows fluid to flow into the biasing compartment 194. As the fluid fills into the biasing compartment 194, the fluid applies a force on the second end 144 of the dynamic sleeve 140 in the forward direction F1. Likewise, the spring 192 also applies a force on the second end 144 of the dynamic sleeve 140 in the forward direction F1. As a result, the dynamic sleeve 140 is translated in the forward direction F1 along the axial direction A. As noted above, translating the dynamic sleeve 140 in the forward direction F1 increases the first damper gap G1, which in turn increases the thickness of the first squeeze film 168, which provides higher damping capability.

To translate the dynamic sleeve 140 in the aft direction A1 along the axial direction A, the first control valve 174 is actuated to an open or more open position. As noted above, this increases the amount of fluid 180 in the control compartment 164, and consequently, the applied force on the first end 142 of the dynamic sleeve 140 is increased. This force pushes the dynamic sleeve 140 in the aft direction A1. At the same time, the biasing control valve 196 is actuated to a closed or more closed position, thereby decreasing the amount of fluid 180 within the biasing compartment 194. As the fluid flows out of the biasing compartment 194, the fluid applies less of a force on the second end 144 of the dynamic sleeve 140 in the forward direction F1. The spring 192 compresses as the volume of fluid increases in the control compartment 164. As a result, the dynamic sleeve 140 is translated in the aft direction A1 along the axial direction A. As noted above, translating the dynamic sleeve 140 in the aft direction A1 decreases the first damper gap G1, which in turn provides lower damping.

Figure 6:
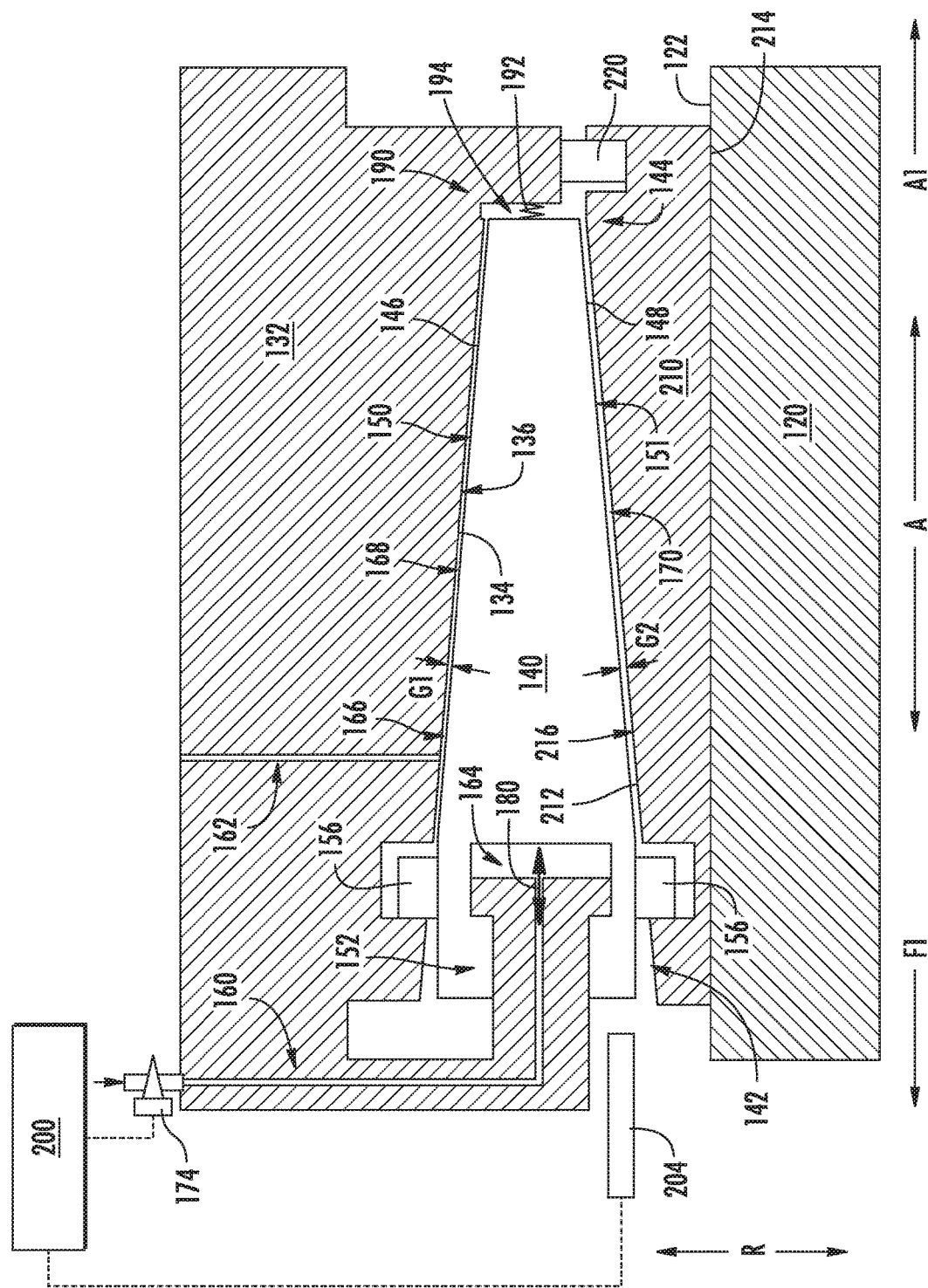
FIG. 6 provides a close up, cross-sectional view of another exemplary damper assembly according to an exemplary embodiment of the present disclosure.

FIG. 6 provides a close up, cross-sectional view of another exemplary damping system 100 according to an exemplary embodiment of the present disclosure. In particular, for this embodiment, the damping system 100 includes a dynamic sleeve 140 that includes dual variable damping gaps.

As shown in FIG. 6, the first wall 146 of the dynamic sleeve 140 includes inclined surface 150. The first wall 134 of the damper housing 132 also has inclined surface 136 that is complementary to the inclined surface 150 of the first wall 146 of the dynamic sleeve 140. A variable damping gap, first damper gap G1, is defined therebetween to form first squeeze film 168. In this embodiment, the first damper gap G1 maintains at least some distance between the inclined surfaces 136, 150 no matter the axial position of the dynamic sleeve 140 such that damping system 100 can provide damping during normal operating conditions.

As further shown in FIG. 6, the second wall 148 of the dynamic sleeve 140 also includes an inclined surface 151. For this embodiment, the damping system 100 includes a second sleeve 210 disposed between the dynamic sleeve 140 and the bearing interface 120. The second sleeve 210 includes a first wall 212 and a second wall 214 spaced apart from the first wall 212 along the radial direction R. The second wall 214 of the second sleeve 210 is operatively coupled with the bearing interface 120, and more particularly, the first wall 122 of the bearing interface 120. For this embodiment, the second sleeve 210 is stationary; the second sleeve 210 does not rotate about the axial direction A or translate along the axial direction A. The first wall 212 of the second sleeve 210 includes an inclined surface 216 that is complementary to the inclined surface 151 of the second wall 148 of the dynamic sleeve 140. A variable radial gap, second damper gap G2, is defined therebetween to form second squeeze film 170. In some embodiments, like the first damper gap G1, the second damper gap G2 maintains at least some distance between the inclined surfaces 151, 216 such that damping system 100 can provide damping during normal operating conditions. As the damping system 100 of FIG. 6 includes variable first and second damper gaps G1, G2, the damping system 100 is configured as a dual variable film squeeze film damper assembly.

In some alternative embodiments, the second sleeve 210 can be formed integrally with or can be a part of the bearing interface 120. In this way, the first wall 122 of the bearing interface 120 can include incline surface 216 that is complementary to the inclined surface 151 of the dynamic sleeve 140. In some alternative embodiments, the second sleeve 210 can be formed integrally with or can be a part of the damper housing 132. In this way, the damper housing 132 can include incline surface 216 that is complementary to the inclined surface 151 of the dynamic sleeve 140.

With reference still to FIG. 6, for this embodiment, the inclined surface 150 of the first wall 146 inclines radially inward as the dynamic sleeve 140 extends along the axial direction A in the aft direction A1. Likewise, in a complementary manner, the inclined surface 136 of the first wall 134 of the damper housing 132 inclines radially inward along the length of the inclined surface 150 of the dynamic sleeve 140 as the dynamic sleeve 140 extends along the axial direction A in the aft direction A1. Moreover, the inclined surface 151 of the second wall 148 of the dynamic sleeve 140 inclines radially outward as the dynamic sleeve 140 extends along the axial direction A in the aft direction A1. Likewise, in a complementary manner, the inclined surface 216 of the first wall 212 of the second sleeve 210 inclines radially outward along the length of the inclined surface 151 of the dynamic sleeve 140 as the dynamic sleeve 140 extends along the axial direction A in the aft direction A1.

Moreover, for this embodiment, the dynamic sleeve 140 includes a first end portion 152 in which the outer and inner walls 146, 148 do not incline or gradually narrow along the axial direction A. The first end portion 152 allows for seals 156 to engage or seal against the dynamic sleeve 140 regardless of its axial position.

With reference still to FIG. 6, for this embodiment, the control compartment 164 is defined by the dynamic sleeve 140. As shown, the first conduit 160 provides fluid communication between a fluid supply (not shown) and the control compartment 164. The first conduit extends into the control compartment 164 and has flanges that seal against the interior walls of the dynamic sleeve 140 that define the control compartment 164. A first control valve 174 is positioned along the first conduit 160 to selectively control the amount of fluid 180 within the control compartment 164 in a manner as described above.

The squeeze film compartment 166 is generally defined about the dynamic sleeve 140 as shown in FIG. 6. For this embodiment, the biasing compartment 194 fluidly connects the first squeeze film 168 and the second squeeze film 170. The first squeeze film 168 is defined between the inclined surface 136 of the damper housing 132 and the inclined surface 150 of the first wall 146 of the dynamic sleeve 140 along the radial direction R. The first squeeze film 168 is defined between seal 156 proximate the first end 142 of the dynamic sleeve 140 and the biasing compartment 194 along the axial direction A. The first squeeze film 168 also extends in the circumferential direction C annularly about the rotary component 102 (FIG. 2). The biasing compartment 194 is defined by the damper housing 132, a seal 220, the second sleeve 210, and the second end 144 of the dynamic sleeve 140 as shown in FIG. 6. Spring 192 is disposed within the biasing compartment 194 and is operatively configured to bias or urge the dynamic sleeve 140 in the forward direction F1 along the axial direction A. The biasing compartment 194 is contiguous with the first squeeze film 168; thus, the biasing compartment 194 and the first squeeze film 168 are fluidly connected. The second squeeze film 170 is defined between the inclined surface 216 of the second sleeve 210 and the inclined surface 151 of the second wall 148 of the dynamic sleeve 140 along the radial direction R. The second squeeze film 170 is defined between seal 156 proximate the first end 142 of the dynamic sleeve 140 and the biasing compartment 194 along the axial direction A. The second squeeze film 170 also extends in the circumferential direction C annularly about the rotary component 102 (FIG. 2). The second squeeze film 170 is contiguous with the biasing compartment 194; thus, the biasing compartment 194 and the second squeeze film 170 are fluidly connected. As further shown in FIG. 6, the damper housing 132 defines the second conduit 162. The second conduit 162 provides fluid communication between the fluid supply (not shown) and the squeeze film compartment 166.

For normal operating conditions of the rotary component 102 (FIG. 2), the damping system 100 of FIG. 6 can actively control the damping response of the system by translating the dynamic sleeve 140 in the following manner. Once it is determined that the rotary component 102 is operating under normal conditions, the controller 200 can send one or more control signals to the first control valve 174 to actuate to a fully open or more open position. The first control valve 174 can be actuated to a fully opened or more opened position based on the vibration parameters and the current axial position of the dynamic sleeve 140 obtained from the vibration sensor 202 and proximity sensor 204, respectively.

When the first control valve 174 is actuated to a fully open or more opened position, the volume of fluid 180 flowing into the control compartment 164 is increased, and accordingly, the force applied by the fluid on the interior walls of the control compartment 164 of the dynamic sleeve 140 is increased. The increased force on the interior walls of the control compartment 164 translates the dynamic sleeve 140 in the aft direction A1 (as shown in FIG. 6) when the force overcomes the biasing force applied on the dynamic sleeve 140 by the spring 192. The proximity sensor 204 can provide feedback signals to the controller 200 to ensure that the dynamic sleeve 140 has translated to the desired axial position.

As the dynamic sleeve 140 translates in the aft direction A1 along the axial direction A, the variable damping gaps decrease. More particularly, for this embodiment, the first damper gap G1 and the second damper gap G2 decrease. Stated differently, the clearance between the inclined surface 150 of the first wall 146 of the dynamic sleeve 140 and the inclined surface 136 of the first wall 134 of the damper housing 132 decreases, and in a similar manner, the clearance between the inclined surface 151 of the second wall 148 of the dynamic sleeve 140 and the inclined surface 216 of the first wall 212 of the second sleeve 210 decreases. The axial translation of the dynamic sleeve 140 squeezes fluid 180 out of the squeeze film compartment 166. In particular, fluid 180 is squeezed out of the second squeeze film 170, the biasing compartment 194, and then the first squeeze film 168. By decreasing the variable radial gaps, the damping system 100 can provide optimal damping for normal operating conditions. As both the first damper gap G1 and the second damper gap G2 are maintained during normal operating conditions, the damping system 100 acts as a dual film damping system during normal operating conditions.

For high unbalanced or high eccentricity conditions of the rotary component 102 (FIG. 2), the damping system 100 of FIG. 6 can actively control the damping response of the system by translating the dynamic sleeve 140 in the following manner. Once it is determined that the rotary component is experiencing a high unbalanced or high eccentricity condition, the controller 200 can send one or more control signals to the first control valve 174 to actuate to a fully closed or more closed position. The first control valve 174 can be actuated to a closed or more closed position based on the vibration parameters and the current axial position of the dynamic sleeve 140 obtained from the vibration sensor 202 and proximity sensor 204, respectively.

When the first control valve 174 is actuated to a closed or more closed position, the volume of fluid 180 flowing to the control compartment 164 is reduced, and accordingly, the force applied by the fluid on the interior walls of the control compartment 164 of the dynamic sleeve 140 is decreased. The decreased force on the interior walls of the control compartment 164 and the reduced volume of fluid within the control compartment 164 allows the spring 192 to expand, causing the dynamic sleeve 140 to translate in a forward direction F1 along the axial direction A. The proximity sensor 204 can provide feedback signals to the controller 200 to ensure that the dynamic sleeve 140 has translated to the desired axial position.

As the dynamic sleeve 140 translates in the forward direction F1 along the axial direction A, the variable damper gaps increase. More particularly, for this embodiment the first damper gap G1 and the second damper gap G2 both increase. Stated alternatively, the clearance between the inclined surface 150 of the first wall 146 of the dynamic sleeve 140 and the inclined surface 136 of the first wall 134 of the damper housing 132 increases, and in a similar fashion, the clearance between the inclined surface 151 of the second wall 148 of the dynamic sleeve 140 and the inclined surface 216 of the first wall 212 of the second sleeve 210 increases. This allows fluid 180 (or more fluid) to flow into the squeeze film compartment 166. More particularly, the forward translation of the dynamic sleeve 140 causes fluid to flow or squeeze into the first damper gap G1. Fluid 180 then flows through the biasing compartment 194 and squeezes into the second squeeze film 170. As fluid is squeezed into the second squeeze film 170 and first squeeze film 168, the damping system 100 acts as a dual film squeeze film damper during high unbalanced operations. By increasing the variable damper gaps, the damping system 100 can optimize the damping response for high unbalanced conditions.

The various damping systems described herein can provide numerous advantages. For instance, implementation of a damping system of the present disclosure can provide optimized damping capability during bowed rotor conditions & high cycle fatigue (HCF) unbalances, leading to lower start times, better clearance control & less HCF failures. Moreover, implementation of a damping system disclosed herein can lead to improvement in stability and reduction of nonsynchronous vibration (NSV); can assist with avoiding whirl; and can provide stable operations under oil loss or cold oil conditions. In addition, implementation of the damping system 100 of the present disclosure can reduce air motoring on starts, leading to quicker turnaround times for short haul flights. Also, tighter clearances can be achieved with implementation of one of the damping systems disclosed herein, leading to improved specific fuel consumption and improved efficiencies more generally.

Figure 7:
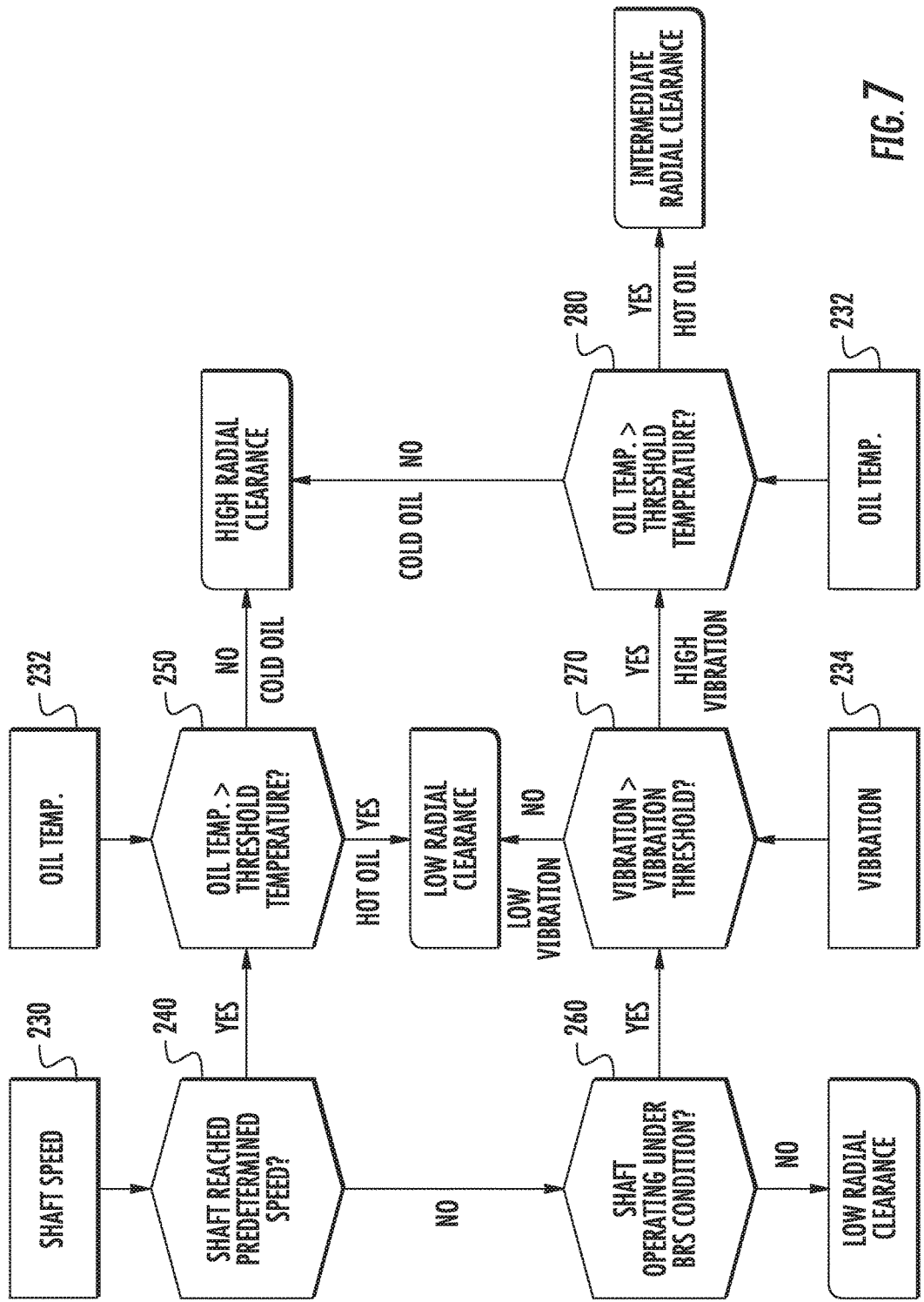
FIG. 7 provides an exemplary flow diagram for controlling an exemplary damping system according to an exemplary embodiment of the present disclosure.

FIG. 7 provides an exemplary flow diagram for controlling an exemplary damping system, such as those described herein, according to an exemplary embodiment of the present disclosure. As shown in FIG. 7, various measured or sensed inputs can be fed to a controller, such as the controller 200 of the FIG. 2, for processing such that a damping system, such as one of the damping systems described herein, can optimize the damping response to the vibration of a rotary component, such as the rotary component 102 of the turbofan engine 10 depicted in FIGS. 1 and 2 and described in the accompanying text. For this embodiment, the measured inputs include a rotary or shaft speed 230, an oil temperature 232, and the vibration 234 of the rotary component.

As shown in FIG. 7, the shaft speed 230 is fed to control logic block 240. At block 240, it is determined whether the shaft has reached or obtained a predetermined speed. If the shaft has indeed reached the predetermined speed, at block 250, it is next determined whether the oil temperature of the oil of the gas turbine engine is greater than a threshold temperature. As shown, the measured or sensed oil temperature 232 is fed to control logic block 250 so that such a determination can be made.

If the oil temperature is greater than the threshold temperature at block 250, it is determined that there is a hot oil condition; and thus, the system determines that a low radial clearance or gap would best optimize the damping response to the vibration of the shaft. Accordingly, in such instances, the controller of the damping system will control the dynamic sleeve to translate in the aft direction along the axial direction. As the dynamic sleeve translates in the aft direction, the variable damper gap(s) are decreased or closed, which in turn optimizes the damping response for normal operations as described above. When the oil temperature is greater than the threshold temperature, optimizing the damping response for normal operating conditions can be achieved by translating the dynamic sleeve to the second position as shown in FIG. 4.

If the oil temperature 232 is less than the threshold temperature as determined at block 250, it is determined that there is a cold oil condition. If the shaft has reached the predetermined speed (as determined at block 240) and the oil temperature is less than the threshold temperature (as determined at block 250), a shaft or rotary component can experience a high unbalanced load or high eccentricity. Accordingly, the system determines that a high radial gap or clearance would best optimize the damping response to the vibration of the shaft. Hence, in such instances, the controller of the damping system controls the dynamic sleeve to translate in the forward direction along the axial direction. As the dynamic sleeve translates in the forward direction, the variable damper gap(s) are increased or opened, which in turn provides the damping system with high damping capability as described above. When the oil temperature is less than the threshold temperature, high damping can be achieved by translating the dynamic sleeve to the first position as shown in FIG. 3A.

Returning to block 240 of FIG. 7, if the shaft has not reached the predetermined speed, it is next determined whether the shaft is operating under a bowed rotor start (BRS) condition at block 260. After a gas turbine engine has been operated and is then shut off, the engine is hot and due to heat rise, the upper portions of the engine will be hotter than lower portions of the engine. When this occurs, thermal expansion may cause deflection of components of the engine, such as the shaft. If the engine is started or attempted to be started while the components are deflected, such a start is termed a "bowed rotor start" condition. During a bowed rotor start, the shaft can experience high unbalanced vibrational loads and high eccentricity.

If the shaft is not operating under a BRS condition as determined at block 260, then the system determines that a low radial gap or clearance would best optimize the damping response to the vibration of the shaft and the dynamic sleeve is translated accordingly to adjust the variable damper gap(s). If the shaft is operating under a BRS condition, it is next determined at block 270 whether the vibration of the shaft is greater than a vibration threshold. As shown in FIG. 7, the measured vibration 234 is fed into control logic block 270.

If the vibration of the shaft is not greater than the vibration threshold, the system determines that a low radial gap or clearance would best optimize the damping response to the vibration of the shaft. If, on the other hand, the vibration of the shaft is greater than the vibration threshold, it is next determined at block 280 whether the oil temperature is greater than the threshold temperature.

If the oil temperature is less than the threshold temperature, it is determined that there is a cold oil condition and thus high unbalance or high eccentricity of the shaft is likely. Consequently, the system determines that a high radial gap or clearance would best optimize the damping response to the vibration of the shaft. On the other hand, if the oil temperature is greater than the threshold temperature, the system determines that there is a hot oil condition. Thus, if the shaft is being operated under a BRS condition (as determined at block 260), the vibration is greater than the vibration threshold (as determined at block 270), and the oil temperature is less than the threshold temperature (as determined at block 280), the system determines that an intermediate radial gap or clearance would best optimize the damping response to the vibration of the shaft. Stated differently, the dynamic sleeve is translated along the axial direction to an axial position somewhere between the first position (FIG. 3A) and the second position (FIG. 4) such that the optimal damper gap can be achieved for the given conditions.

Figure 8:
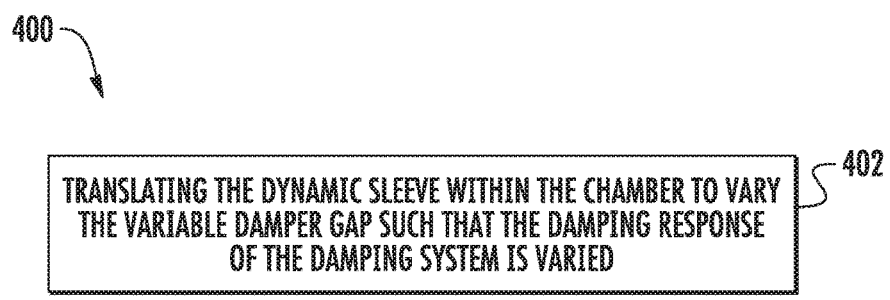
FIG. 8 provides a flow diagram for an exemplary method according to an exemplary embodiment of the present disclosure.

FIG. 8 provides a flow diagram of an exemplary method for varying a damping response of a damping system for a rotary component coupled with a bearing assembly according to an exemplary embodiment of the present disclosure. In such an implementation, the damping system is coupled with the bearing assembly. The damping system also includes a damper housing defining a chamber in which a dynamic sleeve is disposed. A variable damper gap is defined between the dynamic sleeve and at least one of the damper housing and the bearing assembly. Some or all of the method (400) can be implemented by one of the damping systems illustrated and described herein.

At (402), the method (400) includes translating the dynamic sleeve within the chamber to vary the variable damper gap such that the damping response of the damping system is varied. For instance, the dynamic sleeve can be the dynamic sleeve 140 illustrated and described herein. The variable damper gap can be, for example, the first damper gap G1 defined between the damper housing 132 and the first wall 146 of the dynamic sleeve 140. Additionally or alternatively, the variable damper gap can also include the second damper gap G2 defined between the bearing interface 120 and the second wall 148 of the dynamic sleeve 140. The damping system can be the damping system 100 illustrated and described herein. In some implementations, the damping system can be a damping system for a gas turbine engine, such as, e.g., the turbofan engine 10 illustrated and described herein. The rotary component can be the HP shaft 34 or the LP shaft 36 of the turbofan engine 10. Further, in some implementations the dynamic sleeve can be translated along the axial direction defined by the turbofan 10. In addition, in some implementations, the dynamic sleeve can be translated hydraulically, such as e.g., by controlling the amount of fluid within control compartment, pneumatically, magnetically, electromagnetically, electrically, mechanically, some combination of the foregoing, etc.

In some implementations, the damper housing has an inclined surface and the dynamic sleeve has an inclined surface complementary to the inclined surface of the damper housing, and wherein the variable damper gap is defined between the inclined surface of the dynamic sleeve and the incline surface of the damper housing.

In some implementations, the damping system is damping system 100 operatively configured to damp the vibration experienced by a rotating component of a gas turbine engine. The method (400) includes obtaining one or more parameters indicative of the operating conditions of at least one of the rotary component and the gas turbine engine. The one or more parameters can include a rotary component speed, an oil temperature of the gas turbine engine, and a vibration of the rotary component, for example. The controller 200 can obtain the one or more parameters from one or more sensors described herein. The method (400) further includes actuating a first control valve in response to the one or more parameters. For instance, the first control valve can be the first control valve 174 positioned along the first conduit 160. In response to the parameters, the first control valve 174 can actuate a fully closed position, a fully open position, or some position therebetween. The method (400) also includes routing an amount of fluid to or from the control compartment such that the dynamic sleeve translates in such a way that the first damper gap is varied. For instance, the dynamic sleeve can be the dynamic sleeve 140 depicted and described herein. The first damper gap can be the variable first damper gap G1 depicted and described herein. By opening or closing, the first control valve 174 can selectively control the amount of fluid within the control compartment 164, which in turn controls the axial position of the dynamic sleeve 140, which in turn controls the size of the first damper gap G1. By controlling the size of the first damper gap G1, the thickness of the first squeeze film can be controlled to provide an optimal damping response based on the vibrational loads experienced by the rotary component.

In some implementations, the damping system is damping system 100 operatively configured to damp the vibration experienced by a rotating component of a gas turbine engine. In such implementations, the one or more parameters include a rotary component speed and an oil temperature of the gas turbine engine. In such implementations, the method further includes determining whether the rotary component speed has reached a predetermined speed. The method also includes determining whether the oil temperature is greater than a threshold temperature. In such implementations, during routing, if the rotary component speed has reached the predetermined speed and the oil temperature is not greater than the threshold temperature, the amount of fluid within the control compartment is reduced such that the first damper gap is increased.

In some implementations, the damping system is damping system 100 operatively configured to damp the vibration experienced by a rotating component of a gas turbine engine. In such implementations, the one or more parameters include a rotary component speed, an oil temperature of the gas turbine engine, and a vibration of the rotary component. In such implementations, the method further includes determining whether the rotary component speed has reached a predetermined speed. The method also includes determining whether the rotary component is operating under a bowed rotor start condition. The method also includes determining whether the vibration is greater than a vibration threshold. In addition, the method also includes determining whether the oil temperature is greater than a threshold temperature. In such implementations, during routing, if (a) the rotary component speed has not reached the predetermined speed; (b) the rotary component is operating under a bowed rotor start condition; (c) the vibration is greater than the vibration threshold; and (d) the oil temperature is not greater than the threshold temperature then the amount of fluid within the control compartment is reduced such that the first damper gap is increased.

In some implementations, the damping system is damping system 100 operatively configured to damp the vibration experienced by a rotating component of a gas turbine engine. In such implementations, the one or more parameters include a rotary component speed, an oil temperature of the gas turbine engine, and a vibration of the rotary component. In such implementations, the method further includes determining whether the rotary component speed has reached a predetermined speed. The method also includes determining whether the rotary component is operating under a bowed rotor start condition. In such implementations, during routing, if the rotary component speed has not reached the predetermined speed and the rotary component is operating under a bowed rotor start condition, then the amount of fluid within the control compartment is reduced such that the first damper gap is increased.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A gas turbine engine defining an axial direction and a radial direction, the gas turbine engine comprising:
   a rotary component rotatable about the axial direction;
   a bearing assembly operatively coupled with the rotary component and comprising a bearing interface; and
   a damping system, comprising:
      a damper housing spaced apart from the bearing assembly along the radial direction, the damper housing and the bearing interface defining a chamber therebetween, and wherein the damper housing has an inclined surface; and
      a dynamic sleeve disposed within the chamber and having a first wall and a second wall, the first wall of the dynamic sleeve having an inclined surface complementary to the inclined surface of the damper housing, wherein the inclined surface of the damper housing and the inclined surface of the dynamic sleeve define a first damper gap configured to receive an amount of fluid to form a first squeeze film, and wherein the second wall of the dynamic sleeve and the bearing interface define a second damper gap configured to receive an amount of fluid to form a second squeeze film;
      wherein at least one of the damper housing, the bearing interface, and the dynamic sleeve define a control compartment configured to receive an amount of fluid, and wherein a change in the amount of fluid within the control compartment causes the dynamic sleeve to translate within the chamber such that the first damper gap is varied.

2. The gas turbine engine of claim 1, wherein the damper housing defines a first conduit in fluid communication with the control compartment, and wherein the gas turbine engine further comprises:
   a first control valve positioned along the first conduit for selectively controlling the amount of fluid in the control compartment.

3. The gas turbine engine of claim 1, wherein the dynamic sleeve defines a radial throughhole that provides fluid communication between the first squeeze film and the second squeeze film.

4. The gas turbine engine of claim 1, wherein the chamber is segmented into the control compartment and a squeeze film compartment, the control compartment fluidly disconnected from the squeeze film compartment; and wherein the damper housing defines a second conduit in fluid communication with the squeeze film compartment.

5. The gas turbine engine of claim 1, wherein the dynamic sleeve extends between a first end and a second end along the axial direction, and wherein the control compartment is defined proximate the first end of the dynamic sleeve, and wherein the damping system further comprises:
   a biasing assembly operatively configured to urge the dynamic sleeve along the axial direction in a direction toward the control compartment.

6. The gas turbine engine of claim 5, wherein the biasing assembly comprises:
   a spring operatively coupled with the second end of the dynamic sleeve for urging the dynamic sleeve along the axial direction toward the control compartment.

7. The gas turbine engine of claim 1, wherein the dynamic sleeve extends between a first end and a second end along the axial direction, and wherein the control compartment is defined proximate the first end of the dynamic sleeve, and wherein the damper housing defines a third conduit in fluid communication with a biasing compartment defined by at least one of the damper housing and the bearing interface, the biasing compartment positioned proximate the second end of the dynamic sleeve and operatively configured to receive an amount of fluid, and wherein the biasing assembly comprises:
   a biasing control valve for selectively controlling the amount of fluid in the biasing compartment;
   wherein when the biasing compartment is filled with a threshold amount of fluid, the dynamic sleeve is urged along the axial direction toward the control compartment.

8. The gas turbine engine of claim 1, wherein the second wall of the dynamic sleeve has an inclined surface, and wherein the bearing interface comprises:
   a second sleeve having a first wall, the first wall having an inclined surface complementary to the inclined surface of the second wall of the dynamic sleeve;
   wherein the inclined surface of the second wall of the dynamic sleeve and the inclined surface of the first wall of the second sleeve define the second damper gap, and wherein the change in the amount of fluid within the control compartment causes the dynamic sleeve to translate such that the second damper gap is varied.

9. The gas turbine engine of claim 1, wherein the inclined surfaces of the dynamic sleeve and the damper housing are inclined between about five (5) to about ten (10) degrees with respect to the axial direction.

10. The gas turbine engine of claim 1, wherein the second damper gap is maintained substantially constant as the dynamic sleeve is translated.

11. A damping system for a rotary component coupled with a bearing assembly, the damping system comprising:
   a damper housing disposed about the bearing assembly; and
   a dynamic sleeve translatable within a chamber defined by the damper housing, a first damper gap defined between the dynamic sleeve and at least one of the bearing assembly and the damper housing, and wherein when the dynamic sleeve is translated, the first damper gap is varied such that a damping response of the damping system is varied.

12. The damping system of claim 11, wherein the damper housing has an inclined surface and the dynamic sleeve has a first wall, the first wall of the dynamic sleeve having an inclined surface complementary to the inclined surface of the damper housing, wherein the inclined surface of the damper housing and the inclined surface of the dynamic sleeve define the first damper gap, the first damper gap configured to receive an amount of fluid to form a first squeeze film, and wherein at least one of the damper housing and the dynamic sleeve define a control compartment configured to receive an amount of fluid, and wherein a change in the amount of fluid within the control compartment causes the dynamic sleeve to translate such that the first damper gap is varied.

13. The damping system of claim 12, wherein the dynamic sleeve has a second wall spaced apart from the first wall, wherein the second wall of the dynamic sleeve and the bearing assembly define a second damper gap configured to receive an amount of fluid to form a second squeeze film.

14. The damping system of claim 12, wherein the dynamic sleeve extends between a first end and a second end opposite the first end, and wherein the control compartment is defined proximate the first end of the dynamic sleeve, and wherein damping system further comprises:
  a biasing assembly, comprising:
    a spring operatively coupled with the second end of the dynamic sleeve for urging the dynamic sleeve toward the control compartment.

15. The damping system of claim 12, wherein dynamic sleeve has a second wall having an inclined surface, and wherein the damping system further comprises:
  a second sleeve having a first wall and a second wall spaced apart from the first wall, the second sleeve disposed between the bearing assembly and the second wall of the dynamic sleeve, the first wall of the second sleeve having an inclined surface complementary to the inclined surface of the second wall of the dynamic sleeve;
  wherein the inclined surface of the second wall of the dynamic sleeve and the inclined surface of the first wall of the second sleeve define a second damper gap configured to receive an amount of fluid to form a second squeeze film, and wherein the change in the amount of fluid within the control compartment causes the dynamic sleeve to translate such that the second damper gap is varied.

16. The damping system of claim 15, wherein the dynamic sleeve extends between a first end and a second end opposite the first end, and wherein the control compartment is defined proximate the first end of the dynamic sleeve, and wherein the damper housing defines a third conduit in fluid communication with a biasing compartment defined by the damper housing, the biasing compartment positioned proximate the second end of the dynamic sleeve and operatively configured to receive an amount of fluid, and wherein the biasing compartment provides fluid communication between the first damper gap and the second damper gap, and wherein the biasing assembly comprises:
  a biasing control valve for selectively controlling the amount of fluid in the biasing compartment;
  wherein when the biasing compartment is filled with a threshold amount of fluid, the dynamic sleeve is urged toward the control compartment.

17. The damping system of claim 12, wherein the damper housing defines a first conduit in fluid communication with the control compartment, and wherein the damping system further comprises:
  a first control valve positioned along the first conduit for selectively controlling the amount of fluid in the control compartment;
  a vibration sensor operatively configured to sense a vibration of the rotary component;
  a proximity sensor operatively configured to sense a position of the dynamic sleeve;
  a controller communicatively coupled with the first control valve, the vibration sensor, and the proximity sensor, the controller operatively configured to:
    obtain one or more signals indicative of the vibration of the rotary component;
    obtain one or more signals indicative of the position of the dynamic sleeve; and
    determine a damping response based at least in part on the vibration of the rotary component;
  wherein the first control valve is actuated to control the amount of fluid in the control compartment based at least in part on the damping response and the position of the dynamic sleeve.

18. A method for varying a damping response of a damping system for a rotary component coupled with a bearing assembly, the damping system coupled with the bearing assembly and comprising a damper housing defining a chamber in which a dynamic sleeve is disposed, and wherein a variable damper gap is defined between the dynamic sleeve and at least one of the damper housing and the bearing assembly, the method comprising:
  translating the dynamic sleeve within the chamber to vary the variable damper gap such that the damping response of the damping system is varied.

19. The method of claim 18, wherein the damper housing has an inclined surface and the dynamic sleeve has an inclined surface complementary to the inclined surface of the damper housing, and wherein the variable damper gap is defined between the inclined surface of the dynamic sleeve and the incline surface of the damper housing.

20. The method of claim 18, wherein at least one of the damper housing and the dynamic sleeve define a control compartment, and wherein the method further comprises:
  obtaining one or more parameters indicative of the operating conditions of the rotary component;
  actuating a first control valve in response to the one or more parameters; and
  routing an amount of fluid to or from the control compartment such that the dynamic sleeve translates in such a way that the variable damper gap is varied.

* * * * *